United States Patent [19]

Ueda et al.

[11] Patent Number: 4,898,919
[45] Date of Patent: Feb. 6, 1990

[54] POLYURETHANE ADHESIVE

[75] Inventors: Ryuichi Ueda, Ikeda; Masahito Mori; Kohske Torii, both of Takatsuki, all of Japan

[73] Assignee: Sunstar Giken Kabushiki Kaisha, Osaka, Japan

[21] Appl. No.: 223,106

[22] Filed: Jul. 22, 1988

[30] Foreign Application Priority Data

Jul. 28, 1987 [JP] Japan ................................ 62-189860
Jul. 31, 1987 [JP] Japan ................................ 62-193127

[51] Int. Cl.$^4$ ........................................... C08L 75/06
[52] U.S. Cl. ................................... 525/440; 525/439; 525/454
[58] Field of Search ...................... 525/454, 440, 439

[56] References Cited

U.S. PATENT DOCUMENTS

| | | | |
|---|---|---|---|
| 3,663,513 | 5/1972 | Kazama et al. | 525/440 |
| 4,165,307 | 8/1979 | Mizuno et al. | 525/440 |
| 4,208,495 | 6/1980 | Chang et al. | 525/440 |
| 4,334,034 | 6/1982 | Lehner et al. | 525/440 |
| 4,588,787 | 5/1986 | Kordomenos et al. | 525/454 |
| 4,741,961 | 5/1988 | Frisch et al. | 525/440 |

FOREIGN PATENT DOCUMENTS

| | | | |
|---|---|---|---|
| 0114185 | 8/1984 | European Pat. Off. | |
| 59-232158 | 12/1984 | Japan | 525/440 |
| 60-92364 | 5/1985 | Japan | 525/440 |
| 0770051 | 3/1957 | United Kingdom | 525/440 |
| 1207088 | 9/1970 | United Kingdom | 525/440 |
| 8502581 | 6/1985 | World Int. Prop. O. | |

Primary Examiner—John C. Bleutge
Assistant Examiner—Robert E. L. Sellers, II
Attorney, Agent, or Firm—Wegner & Bretschneider

[57] ABSTRACT

A polyurethane adhesive comprising
(a) a specific block polyurethane polyol produced by reacting a hydrogenated polybutadiene glycol, a polyol having two or more hydroxy groups, and a polyisocyanate,
(b) a thermoplastic polyester urethane rubber, and
(c) a polyisocyanate compound as a crosslinking agent, said polyurethane adhesive being useful for adhesion of low polar materials, particularly adhesion between polypropylene materials and sheets of polyvinyl chloride.

5 Claims, No Drawings

POLYURETHANE ADHESIVE

This invention relates to a polyurethane adhesive, more particularly, to a two-pack polyurethane adhesive comprising as the main adhesion components a thermoplastic polyester urethane rubber and a specific block polyurethane polyol which is useful for adhesion of low polar materials, for example adhesion between polypropylene materials and sheets of polyvinyl chloride (abbreviated as "PVC").

PRIOR ART

Polyolefinic materials (e.g. polypropylene materials), Noryl resin (polyphenylene oxide resin) materials, and composite materials containing polyolefinic fibers or powder (e.g. Bandlesser, Woodren, etc.) have low polarity, and hence, these are hardly adhered to by materials having different polarity (e.g. PVC sheet). Recently, there has been a tendency to use the above materials for interiors of automobiles in view of low cost and excellent design characteristics.

For such a purpose, it is necessary to use good adhesive for adhering such low polar materials as polypropylene materials, etc. As such an adhesive, there has hitherto been used a polyester urethane adhesive where a polyisocyanate compound is used as a crosslinking agent, but it is required to treat previously the surface of the materials to be adhered, for example, in treatment with a primer (e.g. a chlorinated polyolefin), plasma treatment or corona discharge treatment.

The present inventors had tried to improve the adhesion properties of the conventional adhesives which have usually been used for adhesion of these low polar materials by incorporating a specific hydrogenated polybutadiene polyol with the thermoplastic polyester urethane rubber which is a component of the conventional adhesives. The hydrogenated polybutadiene polyol has a similar structure to that of polyolefins of the polyolefinic materials to be adhered and has good adhesion and affinity to the polyolefins, and hence, if the hydrogenated polybutadiene polyol can be incorporated into the conventional adhesives, the adhesive will be suitable for adhering the polyolefinic materials. However, the hydrogenated polybutadiene polyol has low polarity and hence is less compatible with other components of the adhesives, particularly with thermoplastic polyester urethane rubber which has a high polarity, which results in separation of each component. Accordingly, such a composition is unstable and is hardly useful for adhering the low polar materials.

SUMMARY DESCRIPTION OF THE INVENTION

Under the circumstances, the present inventors have further intensively studied to obtain an improved adhesive suitable for adhering low polar materials and have found that when a specific block polyurethane polyol produced by reacting a hydrogenated polybutadiene glycol, a polyol having two or more hydroxy groups in the molecule and a polyisocyanate is incorporated into the conventional polyester urethane rubber adhesive, the resulting adhesive has excellent compatibility and stability and shows excellent adhesion properties to the polyolefinic materials having a high polarity.

An object of the invention is to provide an improved adhesive suitable for adhering low polar materials such as polypropylene materials, Noryl resin materials, polyolefinic fiber or powder-containing composite materials. Another object of the invention is to provide a two-pack polyurethane adhesive suitable for adhesion between polypropylene materials and PVC sheet. A further object of the invention is to provide a two-pack polyurethane adhesive comprising as the main adhesion components a thermoplastic polyester urethane rubber and a specific block polyurethane polyol, and as the crosslinking agent a polyisocyanate compound. These and other objects and advantages of the invention will be apparent to those skilled in the art from the following description.

DETAILED DESCRIPTION OF THE INVENTION

The polyurethane adhesive of the invention comprises (a) a specific block polyurethane polyol produced by reacting a hydrogenated polybutadiene glycol, a polyol having two or more hydroxy groups, and a polyisocyanate, (b) a thermoplastic polyester urethane rubber, and (c) a polyisocyanate compound as a crosslinking agent.

The block polyurethane polyol (a) is novel and is produced by reacting a hydrogenated polybutadiene glycol having a terminal hydroxy group (hereinafter referred to merely as "hydrogenated polybutadiene glycol") with an excess amount of a polyisocyanate to produce a urethane prepolymer having an active isocyanate group (hereinafter referred to as "NCO urethane prepolymer") and then further reacting with a polyol having two or more hydroxy groups in the molecule. Alternatively, the block polyurethane polyol is produced by reacting firstly a polyol having two or more hydroxy groups in the molecule with an excess amount of a polyisocyanate to produce NCO urethane prepolymer and then reacting with a hydrogenated polybutadiene glycol.

The process for producing the block polyurethane polyol is explained in more detail below.

Firstly, a hydrogenated polybutadiene glycol is reacted with a polyisocyanate in such an amount that the active isocyanate group (NCO) of the polyisocyanate becomes excess to the hydroxy group (OH) of the hydrogenated polybutadiene glycol to give NCO urethane prepolymer. This reaction is optionally carried out in an appropriate solvent (e.g. hexane, toluene, heptane, cyclohexane, xylene, methylene chloride, carbon tetrachloride, etc.) at a temperature of from room temperature to 100° C.. The prepolymer produced in the reaction has the active NCO content of 0.5 to 10% by weight, preferably 1 to 5% by weight. The reaction may further optionally be carried out in the presence of a catalyst such as dibutyl tin dilaurate, triethylamine, lead octate, and the like.

To the above NCO urethane prepolymer is added a polyol having two or more hydroxy groups in the molecule which is added as it stands or in the form of a solution in a solvent (e.g. toluene, hexane, heptane, cyclohexane, xylene, methylene chloride, carbon tetrachloride, etc.), and the mixture is reacted at a temperature of from room temperature to 100° C.. The NCO urethane prepolymer and the polyol are usually reacted in a ratio of OH/NCO=1.2–15, preferably 3.0–10.0.

The block polyurethane polyol obtained in the above two stage reaction has the following schematic structure:

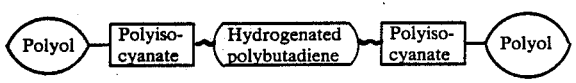

Alternatively, the block polyurethane polymer can be produced by the following process.

Firstly, a polyol having two or more hydroxy groups in the molecule is reacted with a polyisocyanate in such an amount that the active isocyanate group (NCO) of the polyisocyanate becomes excess to the hydroxy group (OH) of the polyol to give NCO urethane prepolymer. This reaction is optionally carried out in an appropriate solvent (e.g. toluene, hexane, heptane, cyclohexane, xylene, methylene chloride, carbon tetrachloride, etc.) at a temperature of from room temperature to 100° C.. The prepolymer produced in the reaction has the active NCO content of 1 to 10% by weight, preferably 1 to 5% by weight.

To the above NCO urethane prepolymer is added a hydrogenated polybutadiene glycol which is added as it stands or in the form of a solution in a solvent (e.g. hexane, toluene, heptane, cyclohexane, xylene, methylene chloride, carbon tetrachloride, etc.), and the mixture is reacted at a temperature of from room temperature to 100° C.. The NCO urethane prepolymer and the hydrogenated polybutadiene glycol are usually reacted in a ratio of OH/NCO=1.2-15, preferably 3.0-10.0.

The block polyurethane polyol obtained the above two stage reaction has the following schematic structure:

The hydrogenated polybutadiene used above includes hydrogenated products of a polybutadiene glycol having a terminal hydroxy group, wherein the polybutadiene has a single structure of a 1,2-vinyl structure or 1,4-trans structure, or a combination structure of 1,2-vinyl structure and 1,4-trans structure; of 1,2-vinyl structure, 1,4-trans structure and 1,4-cis structure; or of 1,4-trans structure and 1,4-cis structure, any of which can be used. In the combination structure, there is no limit in the ratio of the structures. The hydrogenation can be carried out by hydrogenating polybutadiene glycol in an organic solvent (e.g. hexane, heptane, cyclohexane, toluene, etc.) in the presence of a metallic catalyst (e.g. nickel, cobalt, platinum, palladium, ruthenium, etc.) under atmospheric pressure or under pressure.

The polyisocyanate includes, for example, aliphatic polyisocyanates (e.g. hexamethylene diisocyanate, 2,2,4-trimethylhexamethylene diisocyanate, lysine methyl ester diisocyanate, etc.), alicyclic polyisocyanates (e.g. hydrogenated diphenylmethane diisocyanate, isophorone diisocyanate, hydrogenated tolylene diisocyanate, etc.), aromatic polyisocyanates (e.g. tolylene diisocyanate (TDI), diphenylmethane diisocyanate (MDI), naphthylene diisocyanate, xylylene diisocyanate, triphenylmethane triisocyanate, tris(4-phenyl isocyanate) thiophosphate, etc.), and the like. These polyisocyanates may be used alone or in combination of two or more thereof.

The polyol having two or more hydroxy groups in the molecule includes, for example, polyalkylene alkyl ether polyols, polyester polyols, acrylpolyols, polycarbonate polyols, and the like, which may be used alone or in combination of two or more thereof.

The thermoplastic polyester urethane rubber used as the component (b) in this invention is an elastomer having a urethane bond in the molecular chain which is usually a linear high molecular weight compound produced by condensing a polybasic acid (e.g. terephthalic acid, isophthalic acid, phthalic acid, succinic acid, adipic acid, azelaic acid, sebacic acid, etc.) with a dihydric alcohol (e.g. ethylene glycol, 1,4-butanediol, 1,5-pentanediol, 1,6-hexanediol, diethylene glycol, triethylene glycol, polyethylene glycol, propylene glycol, etc.) and reacting the resultant saturated polyester resin having terminal hydroxy group with a diisocyanate compound (e.g. tolylene diisocyanate, diphenylmethane diisocyanate, hexamethylene diisocyanate, xylylene diisocyanate, cyclohexylmethane diisocyanate, etc.) where the hydroxy group of the saturated polyester resin and the isocyanate group of the diisocyanate compound are reacted in about equimolar amount. The polyester urethane rubber thus produced is easily dissolved in an appropriate organic solvent, such as esters (e.g. ethyl acetate, butyl acetate, etc.), ketones (e.g. methyl ethyl ketone, cyclohexanone, acetone, etc.), aromatic solvents (e.g. toluene, xylene, benzene, etc.), chlorinated hydrocarbons (e.g. trichlene (=trichloroethylene), methylene chloride, etc.), and the like.

The polyisocyanate compound used as the component (c) (a crosslinking agent) in this invention includes any compound which is usually used as a crosslinking agent for conventional chloroprene adhesives and polyester urethane adhesives but should have high vapor pressure and be harmless to human and easily handled. Suitable examples of the polyisocyanate compound are triphenylmethane triisocyanate (Desmodur R manufactured by Bayer, in a 20% solution in methylene chloride), triisocyanate phenylthiophosphate (Desmodur RF manufactured by Bayer, in a 20% solution in methylene chloride), tolylene diisocyanate trimethylolpropane adduct [Colonate L manufactured by Nippon Polyurethane K.K., in a 75% solution in ethyl acetate), specific grade MDI (Millionate MR manufactured by Nippon Polyurethane K.K.), and the like.

The polyurethane adhesive of this invention, which contains the essential components of the above (a) to (c) and is usually used in the form of a two-pack adhesive a comprises the main adhesion components of the component (a) and the component (b) and the crosslinking agent of the component (c). The component (a) is preferably incorporated in an amount 2 to 100 parts by weight, more preferably 20 to 60 parts by weight, to 100 parts by weight of the component (b). When the component (a) is used in an amount of less than 2 parts by weight to 100 parts by weight of the component (b), the adhesion force can not be improved, and on the other hand, when the amount of the component (a) is over 100 parts by weight to 100 parts by weight of the component (b), it tends to decrease the coagulation force of the adhesive. The component (c) is usually used in an amount of 1 to 20 parts by weight, preferably 2 to 10 parts by weight, to 100 parts by weight of the sum of the components (a) and (b). When the amount of the component (c) is less than 1 parts by weight to 100 parts by weight of the sum of the components (a) and (b), the adhesive shows inferior adhesion force at heating, and on the other hand, when the amount of the component (c) is over 20 parts by weight to 100 parts by weight of sum of the components (a) and (b), it tends to decrease the adhesion force of the adhesive.

The polyurethane adhesive of this invention may also be optionally incorporated with other conventional additives such as chlorinated polypropylene, chlorinated rubber, and the like.

The polyurethane adhesive of this invention is particularly useful for adhering polyolefinic materials having low polarity [e.g. polypropylene, ethylene-propylenediene terpolymer (abbreviated as EPDM), modified polypropylene, modified polyethylene, etc.), Noryl resin materials, composite materials containing polyolefinic fiber or powder (e.g. Bandlesser, Woodren, etc.)]with a sheet or film of PVC or a foamed product in order to produce laminated products. The adhesive shows excellent adhesion even after heat aging and also adhesion at heating without necessity of surface pretreatment which has been required in the conventional polyurethane adhesives. The polyurethane adhesive of this invention is also useful for adhesion of other plastic materials, wooden materials, metallic materials.

This invention is illustrated by the following Examples and Reference Examples, but should not be construed to be limited thereto.

REFERENCE EXAMPLE 1

Preparation of hydrogenated polybutadiene glycol:

A polybutadiene glycol having terminal hydroxy group [Poly-bd R-45 HT, manufactured by Idemitsu Petrochemical Co., Ltd., 1,4-trans 80% and 1,2-vinyl 20%, molecular weight 28,00] (100 parts by weight) is dissolved in toluene (1000 parts by weight), and thereto is added 10% palladium/carbon catalyst (10 parts by weight). The mixture is subjected to hydrogenation under a hydrogen gas stream with stirring for 10 hours. After the reaction, the catalyst is removed by filtration, and further toluene is removed to give solid hydrogenated polybutadiene glycol. Melting point: 60–70° C., iodine value (g/100 g)<5.

REFERENCE EXAMPLE 2

The above Reference Example 1 is repreated except that a polybutadiene glycol having terminal hydroxy group [Nisso PB 2000 G, manufactured by Nippon Soda K.K., 1,2-vinyl 90% and 1,4-trans 10%, molecular weight, 2000] (100 parts by weight) is used, there is produced liquid hydrogenated polybutadiene glycol. Iodine value (g/100 g)<5.

PREPARATIONS 1 to 6

Preparation of block polyurethane polyol [component (a)]:

A hydrogenated polybutadiene glycol in an amount as shown in Table 1 is reacted with 70% MDI (NCO/OH=2.3) solution in toluene at 80° C. for 5 hours to give a solution of NCO urethane prepolymer in toluene. To the solution is added a 70% solution of various polyols in toluene (OH/NCO=6), and the mixture is reacted at 80° C. for 5 hours to give block polyurethane polyols.

TABLE 1

| Components | Preparation | | | | | |
|---|---|---|---|---|---|---|
| | 1 | 2 | 3 | 4 | 5 | 6 |
| Hydrogenated polybutadiene glycol | | | | | | |
| Reference Example 1 | 100 | 100 | 100 | — | — | — |
| Reference Example 2 | — | — | — | 100 | 100 | 100 |
| MDI | 20 | 20 | 20 | 28 | 28 | 28 |
| Toluene | 50 | 50 | 50 | 50 | 50 | 50 |
| Polyol | | | | | | |
| Polyester polyol*1 | 140 | — | — | 190 | — | — |
| Polycarbonate polyol*2 | — | 270 | — | — | 370 | — |
| Polyalkylene alkyl ether polyol*3 | — | — | 410 | — | — | 560 |
| Toluene | 60 | 120 | 180 | 80 | 160 | 240 |

*1 Adeka New Ace F7-68, manufactured by Asahi Denka Kogyo K.K.
*2 Polycarbonate diol PCD-10, manufactured by Asahi Glass Co., Ltd.
*3 Mitsui Polyethere MN-1500, manufactured by Mitsui Toastu Chemicals, Inc.

PREPARATIONS 7 to 12

Preparation of block polyurethane polyol [component (a)]:

Various polyols in an amount as shown in Table 2 are each reacted with 70% MDI (NCO/OH=2.3) solution in toluene at 80° C. for 5 hours to give a solution of NCO urethane prepolymer in toluene. To the solution is added a 70% solution of hydrogenated polybutadine glycol in toluene (OH/NCO=6), and the mixture is reacted at 80° C. for 5 hours to give block polyurethane polyols.

TABLE 2

| Components | Preparation | | | | | |
|---|---|---|---|---|---|---|
| | 7 | 8 | 9 | 10 | 11 | 12 |
| Polyol | | | | | | |
| Polyester polyol*1 | 100 | 100 | — | — | — | — |
| Polycarbonate polyol*2 | — | — | 100 | 100 | — | — |
| Polyalkylene alkyl ether polyol*3 | — | — | — | — | 100 | 100 |
| MID | 115 | 115 | 57.5 | 57.5 | 38.3 | 38.3 |
| Toluene | 90 | 90 | 70 | 70 | 60 | 60 |
| Hydrogenated | polybutadiene glycol | | | | | |
| Reference Example 1 | 4500 | — | 2300 | — | 1600 | — |
| Reference Example 2 | — | 3100 | — | 1600 | — | 1100 |
| Toluene | 1930 | 1330 | 990 | 690 | 690 | 470 |

*1 Adeka New Ace F7-68, manufactured by Asahi Denka Kogyo K.K.
*2 Polycarbonate diol PCD-10, manufactured by Asahi Glass Co., Ltd.
*3 Mitsui Polyethere MN-1500, manufactured by Mitsui Toastu Chemicals, Inc.

EXAMPLES 1 to 13 AND REFERENCE EXAMPLES 1 and 2

(1) Preparation of adhesives:

A thermoplastic polyester urethane in an amount as shown in Table 3 is dissolved in acetone and toluene, to the solution is added the block polyurethane polyol as prepared in Preparations 1 to 6 to give the main adhesion component, and thereto is incorporated a crosslinking agent (Desmodur R) to give a polyurethane adhesive.

(2) Test of adhesion:

To a polypropylene formed plate (IP 407, manufactured by Mitsui Petrochemical Industries, Ltd., 25×100×3 mm) was applied the adhesive in an amount of 150 g/m². After drying at 80° C. for 2 minutes, a PVC skin sheet (Olsia MP-888, manufactured by Sunstar Giken K.K., 25×200 mm), which was previously heated at 140° C. for 4 minutes, was piled on the polypropylene formed plate, and the laminated product was pressed under a pressure of 0.5 kg/cm$^2$, and thereafter, was aged at 20° C. for 3 days. As to the resulting test sample, a peel strength at normal state was measured with an autograph. Besides, the test sample was kept horizontally wherein the side of PVC skin sheet was downward, and a weight (100 g) was fit to one end of the skin sheet. After 24 hours, the length of peeled sheet was measured (heat creep resistance). The results are shown in Table 3.

TABLE 3

| | Examples | | | | | | | | | | | | | Ref. Exs. | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 |
| Thermoplastic polyester urethane rubber: | | | | | | | | | | | | | | | |
| Desmocol 500*4 | 100 | 100 | 100 | — | — | — | 100 | 100 | 100 | 100 | 100 | 100 | 100 | 100 | — |
| Elitail UE3400*5 | — | — | — | 100 | 100 | 100 | — | — | — | — | — | — | — | — | 100 |
| Acetone | 450 | 450 | 450 | 450 | 450 | 450 | 450 | 450 | 450 | 450 | 450 | 450 | 450 | 450 | 450 |
| Toluene | 450 | 450 | 450 | 450 | 450 | 450 | 450 | 450 | 450 | 450 | 450 | 450 | 450 | 450 | 450 |
| Brock polyurethane polyol: | | | | | | | | | | | | | | | |
| Preparation 1 | 20 | 40 | 60 | 20 | 40 | 60 | — | — | — | — | — | — | — | — | — |
| Preparation 2 | — | — | — | — | — | — | 20 | 40 | 60 | — | — | — | — | — | — |
| Preparation 3 | — | — | — | — | — | — | — | — | — | 40 | — | — | — | — | — |
| Preparation 4 | — | — | — | — | — | — | — | — | — | — | 40 | — | — | — | — |
| Preparation 5 | — | — | — | — | — | — | — | — | — | — | — | 40 | — | — | — |
| Preparation 6 | — | — | — | — | — | — | — | — | — | — | — | — | 40 | — | — |
| Desmodur R | 50 | 50 | 50 | 50 | 50 | 50 | 50 | 50 | 50 | 50 | 50 | 50 | 50 | 50 | 50 |
| Peel strength at normal state (kg/in)*6 | 2.8 | 3.6 | 3.7 | 2.7 | 3.4 | 3.5 | 2.5 | 3.4 | 3.3 | 3.6 | 3.7 | 3.4 | 3.3 | 0.02 | 0.02 |
| Heat creep resistance (mm) | 0 | 0 | 0 | 0 | 0 | 0 | 0 | 0 | 0 | 0 | 0 | 0 | 0 | Fallen | fallent |

EXAMPLES 14 to 26 AND REFERENCE EXAMPLES 3 and 4

(1) Preparation of adhesives:

A thermoplastic polyester urethane in an amount as shown in Table 4 is dissolved in acetone and toluene, to the solution is added the block polyurethane polyol as prepared in Preparations 7 to 12 to give the main component, and thereto is incorporated a crosslinking agent (Desmodur R) to give a polyurethane adhesive.

(2) Test of adhesion:

In the same manner as described in the above Examples 1-13 except that the adhesives prepared above were used, the test of adhesion was carried out. The results are shown in Table 4.

TABLE 4

| | Examples | | | | | | | | | | | | | Ref. Exs. | |
|---|---|---|---|---|---|---|---|---|---|---|---|---|---|---|---|
| | 14 | 15 | 16 | 17 | 18 | 19 | 20 | 21 | 22 | 23 | 24 | 25 | 26 | 3 | 4 |
| Thermoplastic polyester urethane rubber: | | | | | | | | | | | | | | | |
| Desmocol 500*4 | 100 | 100 | 100 | — | — | — | 100 | 100 | 100 | 100 | 100 | 100 | 100 | 100 | — |
| Elitail UE3400*5 | — | — | — | 100 | 100 | 100 | — | — | — | — | — | — | — | — | 100 |
| Acetone | 450 | 450 | 450 | 450 | 450 | 450 | 450 | 450 | 450 | 450 | 450 | 450 | 450 | 450 | 450 |
| Toluene | 450 | 450 | 450 | 450 | 450 | 450 | 450 | 450 | 450 | 450 | 450 | 450 | 450 | 450 | 450 |
| Brock polyurethane polyol: | | | | | | | | | | | | | | | |
| Preparation 1 | 20 | 40 | 60 | 20 | 40 | 60 | — | — | — | — | — | — | — | — | — |
| Preparation 2 | — | — | — | — | — | — | 20 | 40 | 60 | — | — | — | — | — | — |
| Preparation 3 | — | — | — | — | — | — | — | — | — | 40 | — | — | — | — | — |
| Preparation 4 | — | — | — | — | — | — | — | — | — | — | 40 | — | — | — | — |
| Preparation 5 | — | — | — | — | — | — | — | — | — | — | — | 40 | — | — | — |
| Preparation 6 | — | — | — | — | — | — | — | — | — | — | — | — | 40 | — | — |
| Desmodur R | 50 | 50 | 50 | 50 | 50 | 50 | 50 | 50 | 50 | 50 | 50 | 50 | 50 | 50 | 50 |
| Peel strength at normal state (kg/in)*6 | 3.4 | 3.5 | 3.7 | 3.2 | 3.6 | 3.6 | 2.1 | 2.2 | 2.2 | 3.7 | 2.1 | 3.4 | 2.2 | 0.02 | 0.02 |
| Heat creep resistance (mm) | 0 | 0 | 0 | 0 | 0 | 0 | 0 | 0 | 0 | 0 | 0 | 0 | 0 | Fallen | Fallen |

[Note]:
*4 A product manufactured by Bayer.
*5 A product manufactured by UNITIKA Ltd.
*6 In all Examples 14 to 26, cohesive failure was observed in the polypropylene formed plates.

What is claimed is:

1. A polyurethane adhesive which comprises
   (a) a block polyurethane polyol produced by reacting a hydrogenated polybutadiene glycol, a polyol having two or more hydroxy groups in the molecule and a polyisocyanate,
   (b) a thermoplastic polyester urethane rubber, and
   (c) a polyisocyanate compound as a crosslinking agent.

2. The polyurethane adhesive according to claim 1, wherein the block polyurethane polyol (a) is produced by reacting a hydrogenated polybutadiene glycol having a terminal hydroxy group with an excess amount of a polyisocyanate to produce a urethane prepolymer having an active isocyanate group and then further reacting with a polyol having two or more hydroxy groups in the molecule.

3. The polyurethane adhesive according to claim 1, wherein the block polyurethane polyol is produced by reacting firstly a polyol having two or more hydroxy groups in the molecule with an excess amount of a polyisocyanate to produce a urethane prepolymer having an active isocyanate group and then reacting with a hydrogenated polybutadiene glycol having terminal hydroxy group.

4. The polyurethane adhesive according to claim 1, wherein the block polyurethane polyol (a) is contained in an amount of 2 to 100 parts by weight to 100 parts by weight of the thermoplastic polyester urethane rubber (b), and the polyisocyanate compound (c) is contained in an amount of 1 to 20 parts by weight per 100 parts by weight of the sum of the components (a) and (b).

5. The polyurethane adhesive according to claim 4, wherein the the block polyurethane polyol (a) is contained in an amount of 20 to 60 parts by weight to 100 parts by weight of the thermoplastic polyester urethane rubber (b), and the polyisocyanate compound (c) is contained in an amount of 2 to 10 parts by weight per 100 parts by weight of the sum of the components (a) and (b).

* * * * *